United States Patent
Williams et al.

[11] Patent Number: 6,105,102
[45] Date of Patent: Aug. 15, 2000

[54] MECHANISM FOR MINIMIZING OVERHEAD USAGE OF A HOST SYSTEM BY POLLING FOR SUBSEQUENT INTERRUPTS AFTER SERVICE OF A PRIOR INTERRUPT

[75] Inventors: Robert A. Williams, Cupertino; Jerry C. Kuo, San Jose, both of Calif.

[73] Assignee: Advanced Micro Devices, Inc., Sunnyvale, Calif.

[21] Appl. No.: 09/174,037

[22] Filed: Oct. 16, 1998

[51] Int. Cl.[7] .................................................. G06F 13/24
[52] U.S. Cl. ...................... 710/261; 710/260; 710/264; 710/265; 710/266; 710/267; 710/220; 710/41; 710/48; 710/52; 710/56; 712/10; 712/11; 712/14; 712/15; 712/20; 327/142; 380/4; 380/24
[58] Field of Search ..................... 710/260, 261, 710/267, 220, 41, 56, 264, 48, 52, 266, 265; 712/20, 10, 11, 14, 15; 327/142; 380/24, 4

[56] References Cited

U.S. PATENT DOCUMENTS

| | | | |
|---|---|---|---|
| 5,287,523 | 2/1994 | Allison et al. | 710/50 |
| 5,367,689 | 11/1994 | Mayer et al. | 710/260 |
| 5,440,690 | 8/1995 | Rege et al. | 709/250 |
| 5,471,618 | 11/1995 | Isfeld | 710/19 |
| 5,687,381 | 11/1997 | Swanstrom et al. | 710/269 |
| 5,754,764 | 5/1998 | Davis et al. | 709/200 |
| 5,802,288 | 9/1998 | Ekanadham et al. | 709/250 |
| 5,838,962 | 11/1998 | Larson | 712/239 |
| 5,854,921 | 12/1998 | Pickett | 712/239 |
| 5,951,644 | 9/1999 | Creemer | 709/229 |

*Primary Examiner*—Ayaz R. Sheikh
*Assistant Examiner*—Frantz Blanchard Jean
*Attorney, Agent, or Firm*—Monica H. Choi

[57] ABSTRACT

An apparatus and method minimizes processing resource of a host system during service of interrupts generated closely in time by at least one peripheral device. The present invention determines, before the end of a prior interrupt service routine for a prior interrupt, a predicted interrupt time point when a subsequent interrupt will be generated by the at least one peripheral device. The host system operates in a polling mode if the predicted interrupt time point is before a predetermined time period after the end of the prior interrupt service routine. Thus, the host system avoids the processing resources needed for context switching time when the subsequent interrupt is generated closely in time from the prior interrupt. The host system operates in an interrupt mode if the predicted interrupt time point is after the predetermined time period after the end of the prior interrupt service routine. Thus, the host system returns to the foreground task as soon as possible when the subsequent interrupt is not generated sufficiently close in time from the prior interrupt.

16 Claims, 6 Drawing Sheets

MECHANISM FOR MINIMIZING OVERHEAD USAGE OF A HOST SYSTEM BY POLLING FOR SUBSEQUENT INTERRUPTS AFTER SERVICE OF A PRIOR INTERRUPT

TECHNICAL FIELD

This invention relates to peripheral devices used with a host system, and more particularly, to an apparatus and method for minimizing overhead usage of the host system by polling for a subsequent interrupt generated by the peripheral device when the subsequent interrupt is expected to be generated within a predetermined time period after service of a prior interrupt.

BACKGROUND OF THE INVENTION

The present invention will be described with an example application for an Ethernet computer network peripheral device (i.e., a communications network peripheral device) which couples a host computer system to a network of computers (i.e., a communications network). In this example application, the communications network peripheral device issues an interrupt to the host system when the communications network peripheral device has received an information frame, from the communications network, which requires processing by the host system. However, from this example application, it should be appreciated by one of ordinary skill in the art of electronic systems design that the present invention may be practiced for other computer peripheral devices that issue interrupts to the host system.

Referring to FIG. 1, a communications network peripheral device 102 (which may be an Ethernet computer network peripheral device) allows a host computer system 104 to communicate with other computers within a communications network 106 which is comprised of a network of computers. Such a peripheral device 102 receives and transmits information frames on the communications network 106. If the peripheral device 102 is an Ethernet computer network peripheral device, the peripheral device 102 receives and transmits information frames via the communications network 106 in accordance with standard data communications protocols such as the IEEE 802.3 network standard or the DIX Ethernet standard, as is commonly known to one of ordinary skill in the art of Ethernet computer network peripheral device design.

The host system 104 may be a PC or a workstation and includes a CPU (Central Processing Unit) 108. The CPU 108 further processes an information frame from the communications network 106. Referring to FIG. 2, a time line 200 shows an example timing of events when an interrupt is issued by the peripheral device 102 to the CPU 108 of the host system 104.

When the peripheral device 102 receives an information frame from the communications network 106, the peripheral device 102 issues an interrupt to the CPU 108 at time point $t_1$ to indicate to the CPU 108 that an information frame needs processing by the CPU 108. The CPU 108 is typically in the midst of performing other tasks when such an interrupt is issued, and such other tasks are broadly referred to as the foreground task. Referring to FIG. 2, the CPU 108 is performing a foreground task during time period 202 before the interrupt is issued to the CPU 108 at time point $t_1$. At this time point $t_1$, the interrupt bit 204 goes high.

Upon receiving the interrupt at time point $t_1$, an in-context switching time 206 is spent by the CPU 108 from time point $t_1$ to time point $t_2$. During the in-context switching time 206, the CPU 108 transitions from the first foreground task period 202 into an interrupt service routine 208. During the interrupt service routine 208 which is between time point $t_2$ and time point $t_3$, the CPU 108 services the interrupt generated by the peripheral device 102. For example, an information frame received by the peripheral device 102 may be processed by the CPU 108. In addition, the interrupt bit 204 is set low after the CPU 108 starts responding to this high-interrupt bit by entering the interrupt service routine 208.

During the in-context switching time 206, the CPU 108 saves any data that will be useful for returning to any foreground tasks after the interrupt service routine 208. The time duration of the in-context switching time 206 is dependent on the type of the CPU 108 and the type of other resources of the host system 104 such as the type of operating system and the type of memory within host system 104.

After the interrupt service routine 208, an out-context switching time 210 is spent by the CPU 108 from time point $t_3$ to time point $t_4$. During the out-context switching time 210, the CPU 108 transitions out of the interrupt service routine 208 back to the foreground task 202 at time point $t_4$. The time duration of the out-context switching time 210 is dependent on the type of the CPU 108 and the type of other resources of the host system 104 such as the type of operating system and the type of memory within host system 104.

Referring to FIG. 3 (with same reference numbers for similar type of time periods of FIG. 2), the interrupt service routine 208 of FIG. 2 is hereinafter designated as a prior interrupt service routine 208 for servicing a prior interrupt 204. A subsequent interrupt 304 may be generated shortly after the prior interrupt service routine 208 during the out-context switching time 210. In that case, the CPU 108 responds to this subsequent interrupt 304 at time point $t_4$, at the end of the out-context switching time. Then, the CPU 108 enters a subsequent in-context switching time 306 to enter into a subsequent interrupt service routine 308. The signal for the subsequent interrupt 304 turns back low after the CPU starts responding to the subsequent interrupt 304 by entering the subsequent interrupt service routine 308. At the end of the subsequent interrupt service routine 308, a subsequent out-context switching time 310 is spent by the CPU 108 from time point $t_6$ to time point $t_7$. During the subsequent out-context switching time 310, the CPU 108 transitions out of the subsequent interrupt service routine 308 back to the foreground task 202 at time point $t_7$.

Similarly, referring to FIG. 4 (with same reference numbers for similar type of time periods of FIG. 3), the subsequent interrupt 304 may be generated at time point $t_4$ after the CPU 108 has returned to the foreground task 202. The subsequent interrupt 304 is still generated shortly after the prior out-context switching time 210. Similarly in this case, the CPU 108 enters the subsequent in-context switching time 306 to transition into the subsequent interrupt service routine 308.

In either the case of FIG. 3 or FIG. 4, the subsequent interrupt occurs shortly after the prior interrupt service routine 208. Such situations are likely when a peripheral device asserts a burst of interrupts that are generated closely in time. In FIG. 3 and FIG. 4, the CPU 108 is operating in an interrupt mode and switches contexts between servicing an interrupt and performing a foreground task. In the interrupt mode, the host system 104 incurs overhead usage of the CPU 108 for any in-context switching time and any out-context switching time. This overhead usage of the CPU 108 may be better spent by the CPU 108 for performing foreground tasks. Thus, a mechanism for reducing this overhead usage of the CPU 108 for in-context switching time and out-context switching time is desired.

SUMMARY OF THE INVENTION

Accordingly, a primary object of the present invention is to control the CPU of the host system to operate in a polling mode for servicing interrupts that are generated closely in time by a peripheral device. When the CPU operates in the polling mode, the CPU does not return to the foreground task after servicing a prior interrupt. Rather, the CPU polls for any subsequent interrupts in a polling routine. Thus, in the polling mode, when the CPU services interrupts that are generated closely in time, overhead usage of the CPU 108 for in-context switching time and out-context switching time is minimized.

In a general aspect, the present invention minimizes overhead usage of a host system during service of interrupts generated by at least one peripheral device. The present invention includes a data storage unit for storing interrupt time information used for determining, before the end of a prior interrupt service routine, a predicted interrupt time point when a subsequent interrupt will be generated by the at least one peripheral device. A bit storage unit sets the host system in a polling mode if the predicted interrupt time point is before a predetermined time period after the end of the prior interrupt service routine. In addition, the host system is set in an interrupt mode if the predicted interrupt time point is after the predetermined time period after the end of the prior interrupt service routine.

The present invention may be used to particular advantage when the predetermined time period is comprised of at least one of an in-context switching time and an out-context switching time.

In another aspect of the present invention, the host system polls for the subsequent interrupt to enter a subsequent interrupt service routine at the predicted interrupt time point, when the host system operates in the polling mode.

In addition, the present invention may be used to particular advantage when a peripheral device is a communications network peripheral device. In that case, an interrupt is generated by the communications network peripheral device when a predetermined amount of an information frame has been received by the communications network peripheral device from the communications network.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference numbers in FIGS. 1–7 refer to elements having similar structure and/or function and/or similar type of time periods.

DETAILED DESCRIPTION

Figure 3:
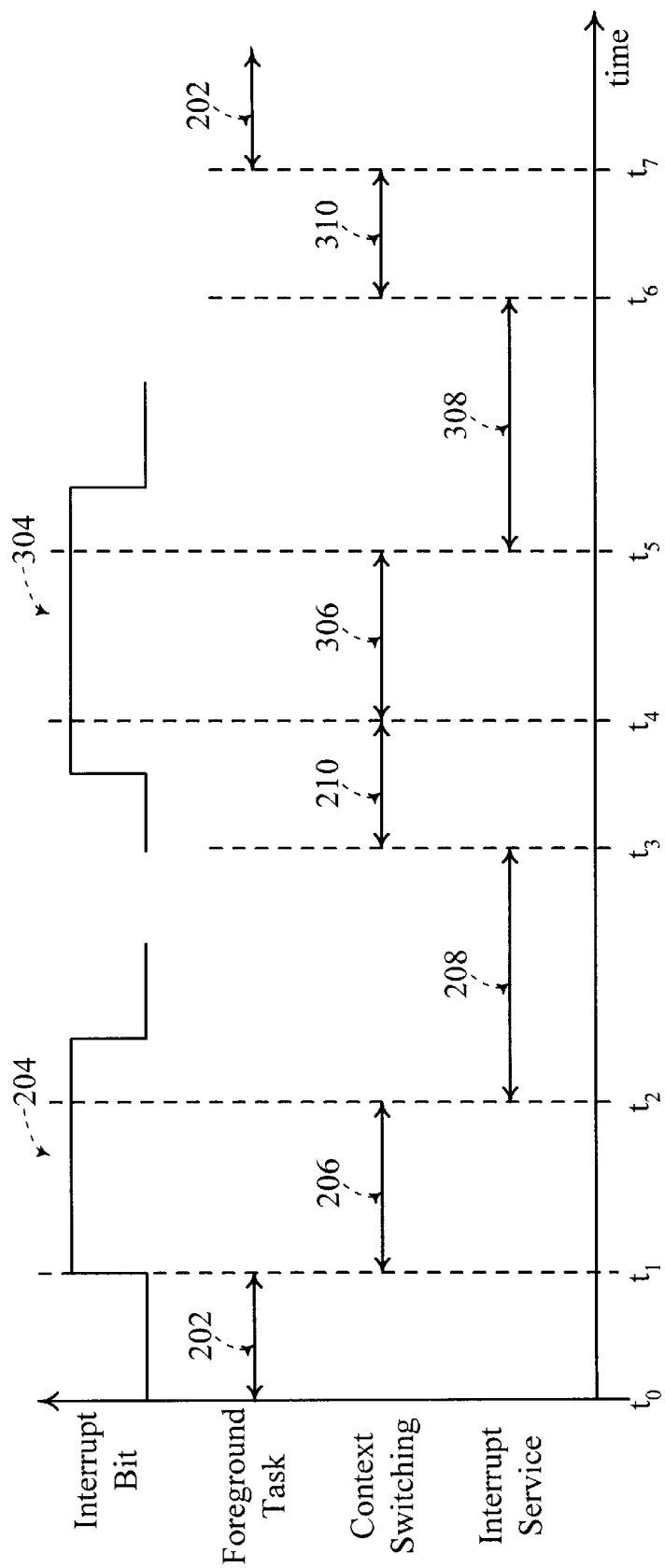
FIG. 3 shows an example time line of events when the host system services multiple interrupts generated closely in time by the peripheral device of FIG. 1, when the host system operates in interrupt mode, according to the prior art.
Figure 4:
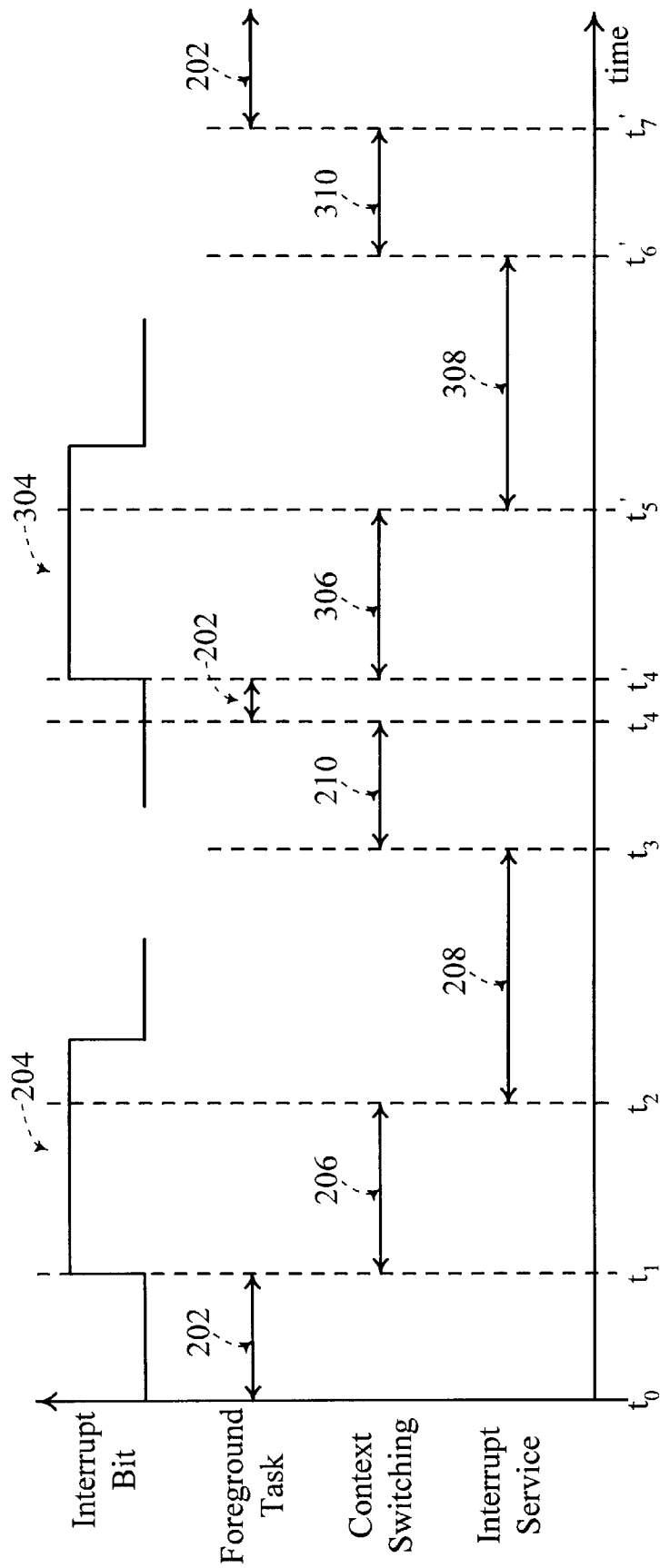
FIG. 4 shows another example time line of events when the host system services multiple interrupts generated closely in time by the peripheral device of FIG. 1, when the host system operates in interrupt mode, according to the prior art.
Figure 5:
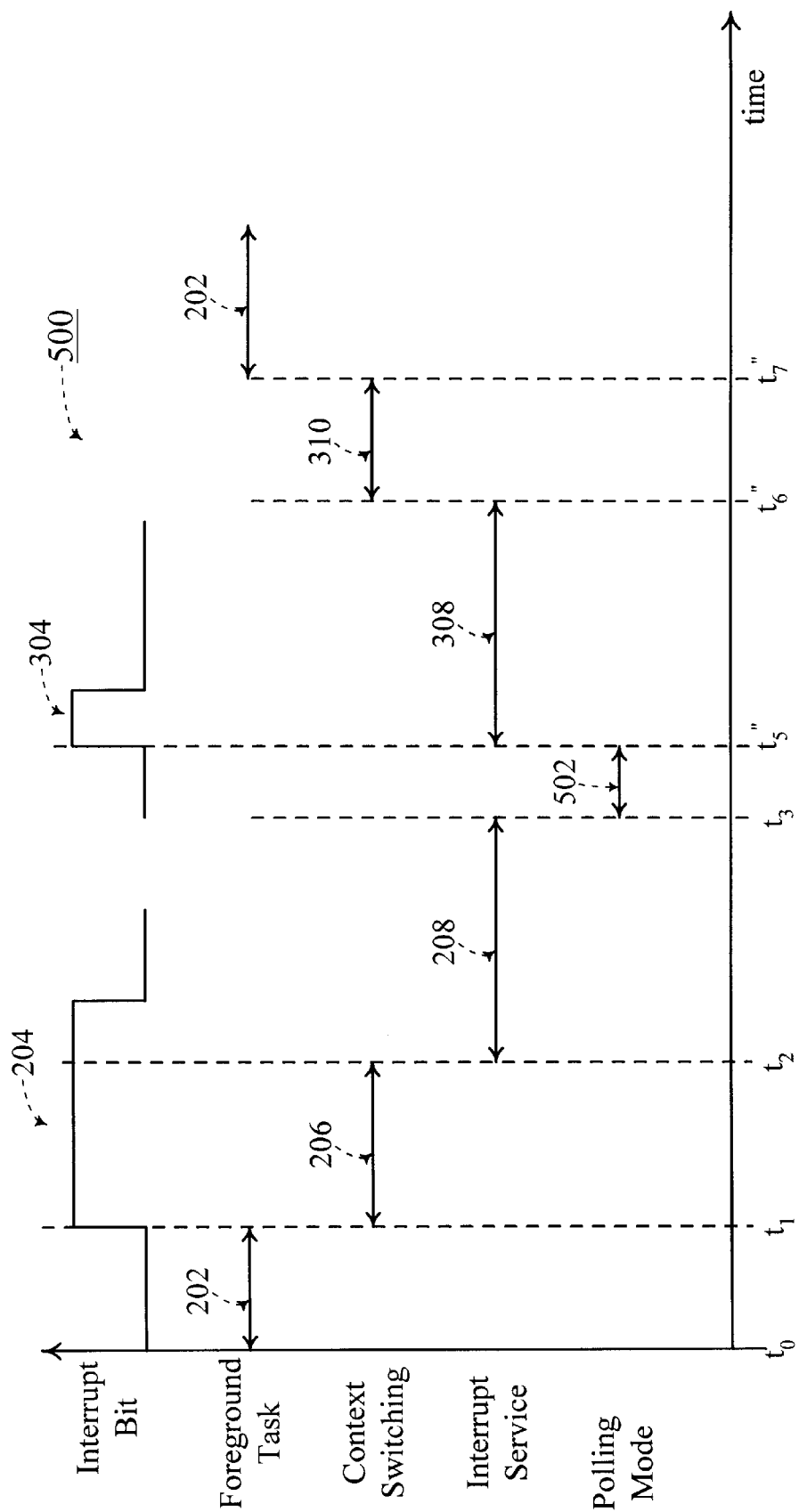
FIG. 5 shows an example time line of events when the host system services multiple interrupts generated closely in time by operating in polling mode, according to an embodiment of the present invention.

Referring to FIG. 5 (with same reference numbers for similar types of time periods of FIGS. 3 and 4), an example time line 500 shows events when the CPU 108 of the host system 104 is controlled to operate in a polling mode, according to a preferred embodiment of the present invention. After the first interrupt service routine 208, the CPU 108 does not revert back to the foreground task. Rather, the CPU 108 is controlled to operate in a polling mode, wherein the CPU 108 polls the peripheral device 102 for any subsequent interrupts.

Referring to FIG. 5, when the peripheral device 102 asserts a burst of interrupts that are generated closely in time, the subsequent interrupt 304 is likely to occur shortly after the prior interrupt 204. Typically, an interrupt is masked during an interrupt service routine. Thus, when the peripheral device 102 asserts a burst of interrupts that are generated closely in time, the subsequent interrupt 304 is likely to occur shortly after the end of the prior interrupt service routine 208.

Referring to FIG. 5, the CPU 108 operates in the polling mode during a polling time period 502 instead of returning to the foreground task after the prior interrupt service routine 208. When the CPU 108 operates in the polling mode, the CPU 108 polls for any interrupts from the peripheral device 102 and services such an interrupt upon detection.

Thus, when the subsequent interrupt occurs at time point $t_5''$, the CPU 108 enters the subsequent interrupt service routine 308 upon detection of the subsequent interrupt at time point $t_5''$. By operating in the polling mode, the CPU 108 does not expend processing resources for the out-context switching time 210 and the in-context switching time 306 as in FIGS. 3 and 4. The CPU 108 may poll for any interrupts during the polling mode 502 according to means which are known to one of ordinary skill in the art.

By operating in the polling mode, the out-context switching time 210 and the in-context switching time 306 (as in the prior art examples of FIGS. 3 and 4) are avoided. Thus, CPU processing resource is conserved, and the subsequent interrupt 304 is serviced by the CPU 108 earlier and thus faster. Furthermore, the CPU 108 returns to the foreground task at an earlier time point $t_7''$ than the later time point $t_7$ of FIG. 3 and $t_{7'}$ of FIG. 4.

The CPU overhead that is saved from avoiding the out-context switching time 210 and the in-context switching time 306 is notably advantageous when the subsequent interrupt 304 occurs shortly after the prior interrupt service routine 208. However, if the subsequent interrupt 304 were to occur long after the prior interrupt service routine 208, then the CPU 108 would waste time running in a polling loop in the polling mode 502 until the occurrence of the subsequent interrupt.

Figure 6:
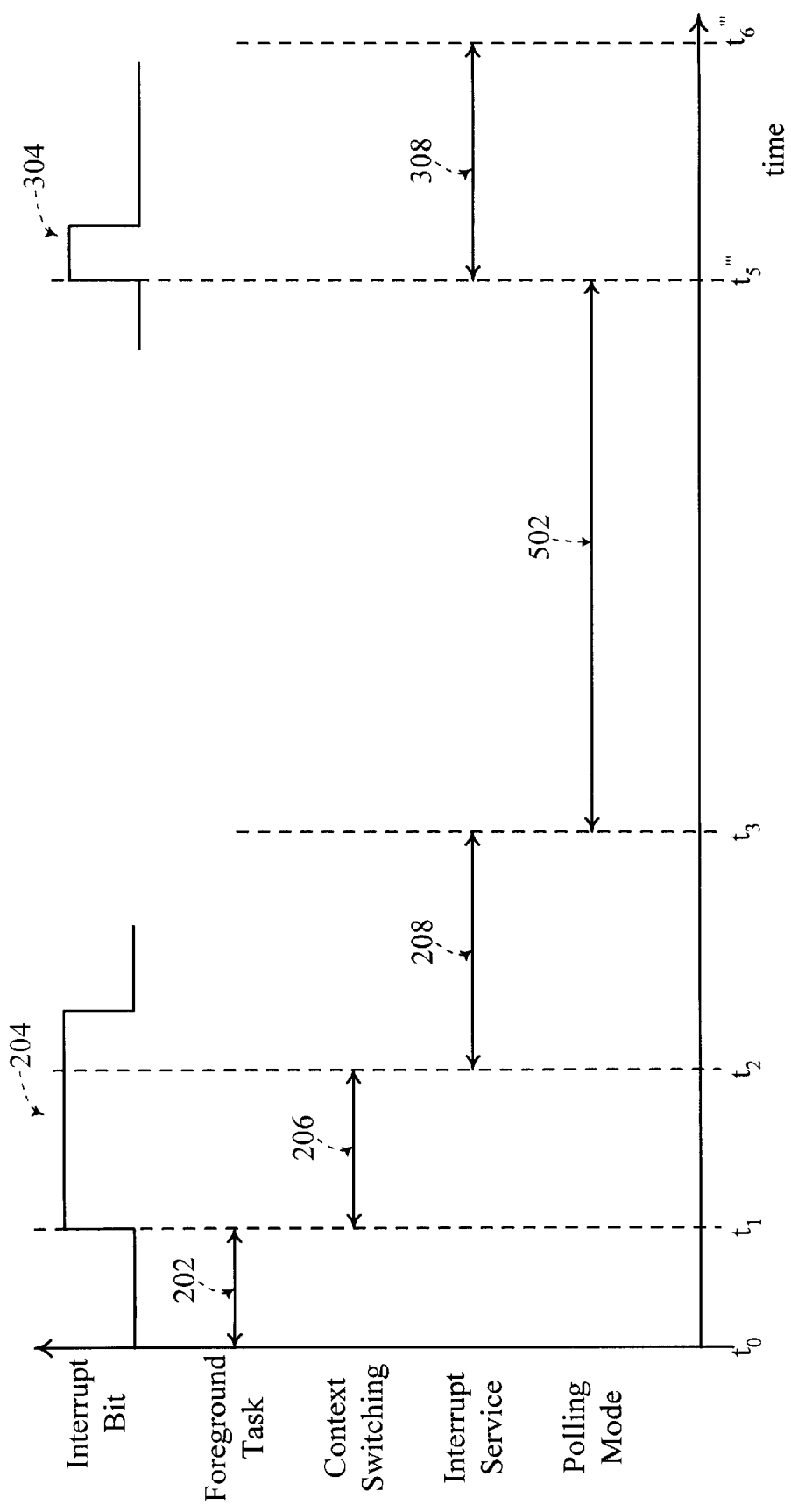
FIG. 6 shows an example time line of events when the host system services multiple interrupts generated far apart in time by undesirably operating in polling mode.

FIG. 6 (with same reference numbers for similar type of time periods of FIG. 5) illustrates such a situation when the subsequent interrupt 304 occurs long after the prior interrupt service routine 208. If the CPU 108 operates in the polling mode in this situation, the time point $t_5'''$ when the subsequent interrupt is serviced occurs relatively long after the prior interrupt service 208. The CPU 108 processing resource has been wasted in the long polling mode 502.

Figure 1:
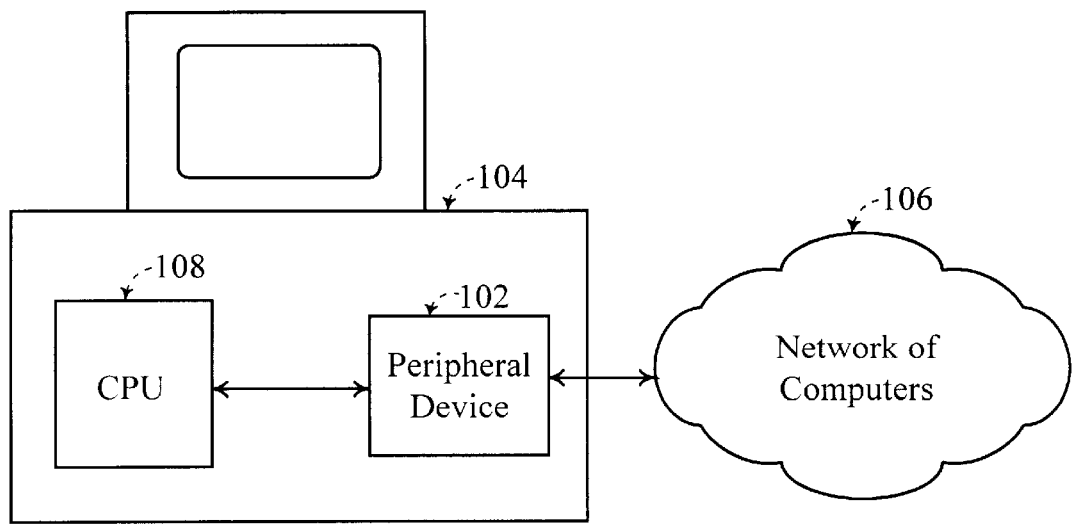
FIG. 1 shows as an example computer peripheral device, a communications network peripheral device within a host system that is coupled to a communications network of computers.
Figure 2:
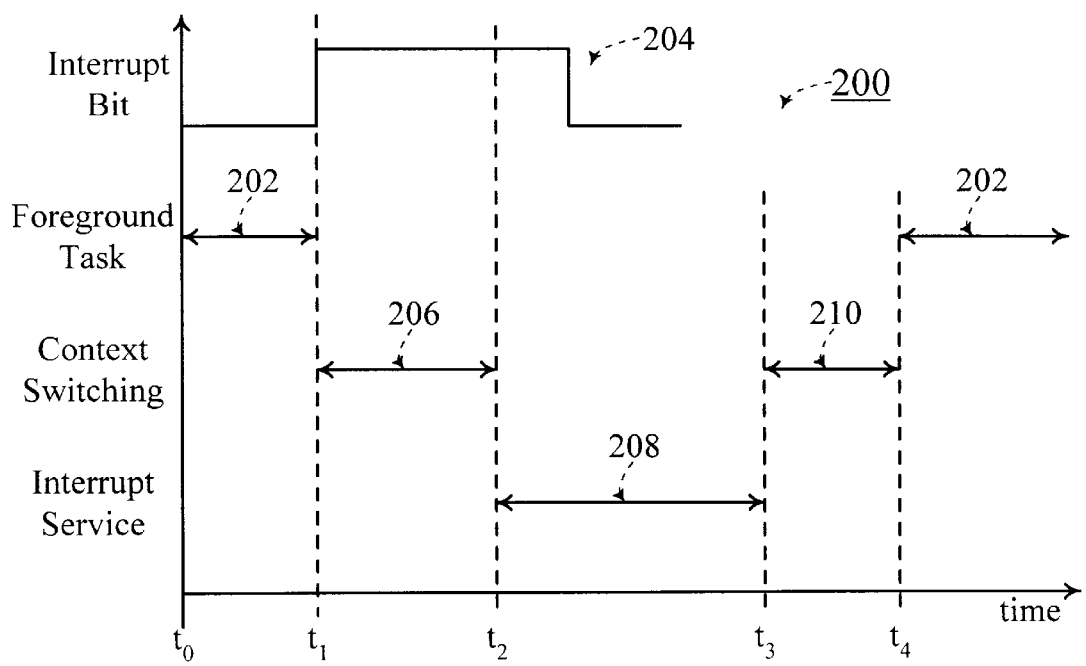
FIG. 2 shows a time line of events when the host system services an interrupt generated by the peripheral device of FIG. 1.

In such a situation, it would be more advantageous for the CPU 108 to return to the foreground task after the end of the prior interrupt service routine 208 as illustrated in FIG. 2. By returning to the foreground task shortly after the prior interrupt service routine 208, the processing resource of the CPU 108 may be used for the foreground task as soon as possible. Then, the CPU 108 may service the subsequent interrupt 304 later in time after the subsequent interrupt 304 is generated. Thus, when the subsequent interrupt 304 is generated long after the prior interrupt service routine 208, the CPU 108 is controlled to operate in interrupt mode.

Accordingly, to minimize the overhead usage of the CPU 108 during service of interrupts generated by a peripheral device, the CPU 108 is set in one of two modes after the prior interrupt service routine 208. If the subsequent interrupt 304 is expected to occur at a predicted interrupt time point which is within a predetermined time period after the end of the prior interrupt service routine 208, then the CPU 108 of the host system 104 is set to operate in polling mode. On the other hand, if the predicted interrupt time point of the subsequent interrupt 304 is expected to occur after the predetermined time period after the end of the prior interrupt service routine 208, then the CPU 108 of the host system 104 is set to operate in interrupt mode.

In one embodiment of the present invention, the predetermined time period is comprised of an approximation of the in-context switching time, 206 or 210, and the out-context switching time, 306. The duration of these context switching times is dependent on the type of the CPU 108, the type of other resources of the host system 104 such as the type of operating system, the type of memory within host system 104, and the type of foreground task, among other factors. Such context switching times may be approximated and/or averaged as known to one of ordinary skill in the art.

The predicted interrupt time point when the subsequent interrupt 304 is generated may be determined as known to one of ordinary skill in the art. For example, when the peripheral device 102 receives an information frame from the communications network of computers 106, the total length of the information frame may be determined. Then, the predicted interrupt time point may be determined from the rate of data reception by the peripheral device 102 from the communications network 106 and from the total length of the information frame.

Alternatively, the predicted interrupt time point may be determined by any other means known to one of ordinary skill in the art. For example, an earlier filed copending patent application, with Ser. No. 08/882,604, filed on Jun. 25, 1997, entitled "Information Packet Reception Indicator for Reducing the Utilization of a Host System Processor Unit," and having common assignee as that of the present invention, describes a means for determining a substantially optimum interrupt time. This copending patent application is incorporated herewith, by reference. Such an example means for determining an interrupt time may be used with the present invention for determining the predicted interrupt time point.

Figure 7:
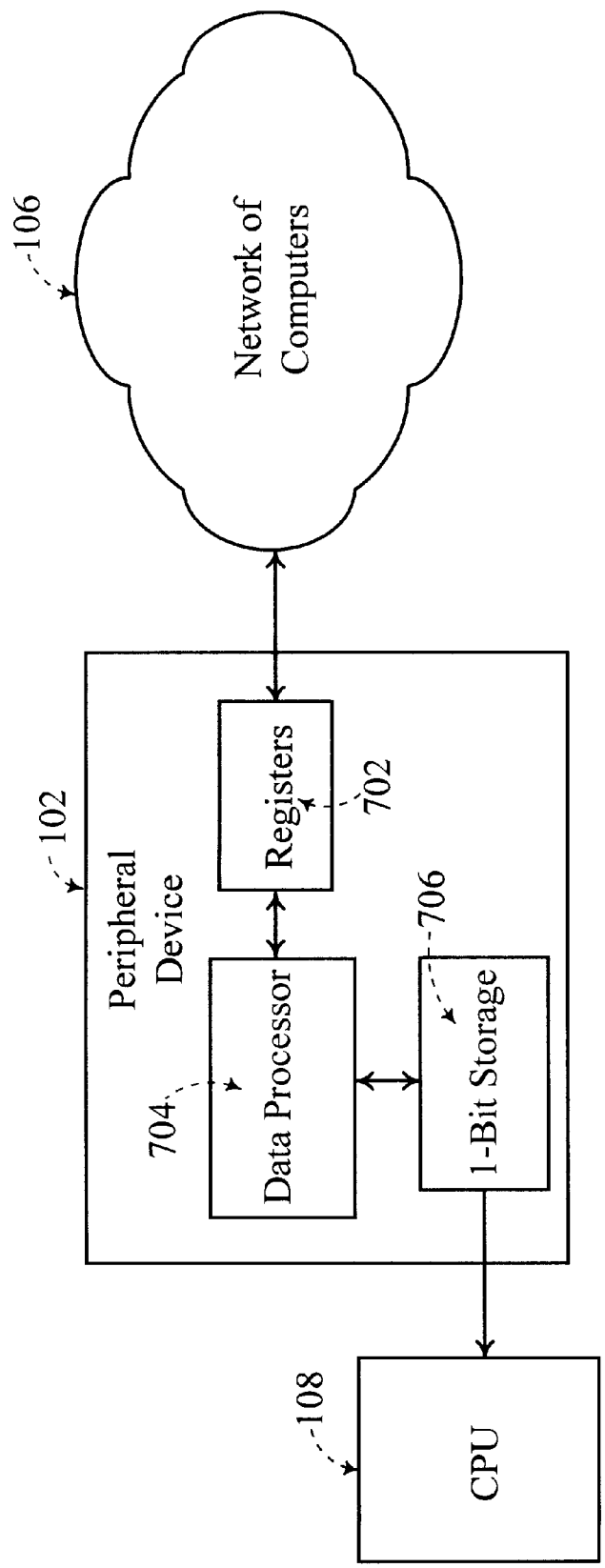
FIG. 7 shows components for controlling the host system to operate in a polling mode or an interrupt mode to minimize overhead usage of the host system for context switching, according to an embodiment of the present invention.

Generally, referring to FIG. 7, the peripheral device 102 includes at least one register 702 for storing interrupt time information used for determining the predicted interrupt time point when the subsequent interrupt 304 will be generated by the peripheral device 102. For example, when the peripheral device 102 receives an information frame from the communications network of computers 106, the register 702 may contain the frame header of the information frame which indicates the total length of the information frame and the rate of data reception by the peripheral device 102 from the communications network 106. Then, the predicted interrupt time point may be determined from the rate of data reception and from the total length of the information frame. Alternatively, the interrupt time information may be stored in any type of data storage unit as is known to one of ordinary skill in the art.

A data processor 704 within the peripheral device 102 or the CPU 108 of the host system 102 may determine the predicted interrupt time point. The data processor 704 and the CPU 108 may be any conventional data processing device as is known to one of ordinary skill in the art.

If the data processor 704 within the peripheral device 102 determines the predicted interrupt time point, a 1-bit storage unit 706 stores a start processing bit. The data processor 704 sets the start processing bit within the 1-bit storage unit 706 at a first state (such as a high state) if the predicted interrupt time point is before a predetermined time period to indicate that the CPU 108 is to operate in the polling mode. The data processor 704 sets the start processing bit within the 1-bit storage unit 706 at a second state (such as a low state) if the predicted interrupt time point is after the predetermined time period to indicate that the CPU 108 is to operate in the interrupt mode.

The 1-bit storage unit may be a toggle flip-flop or any other type of data memory device. The CPU 108 then reads the status of the start processing bit within the 1-bit storage unit 706 at the end of the prior interrupt service routine to determine whether to operate in polling mode or interrupt mode for the subsequent interrupt 304.

In this manner, the apparatus and method of the present invention minimizes the overhead usage of the CPU 108 of the host system 104 during service of interrupts generated by the peripheral device 102. The CPU 108 operates in the polling mode for servicing a series of interrupts that are spaced closely in time and thereby minimizes the CPU processing resource for in-context switching time and out-context switching time. When the series of interrupts are not spaced closely in time, the CPU operates in interrupt mode to return to the foreground task as soon as possible.

The foregoing is by way of example only and is not intended to be limiting. For example, the present invention may be implemented by one of ordinary skill in the art from the description herein for any type of peripheral device that issues interrupts to a host system. The reference to a communications network peripheral device is by way of example only. In addition, the present invention may be used with any means known to one of ordinary skill in the art for predicting the time point for a subsequent interrupt. Furthermore, the present invention may be used by one of ordinary skill in the art for efficiently servicing interrupts generated by any number of peripheral devices. The invention is limited only as defined in the following claims and equivalents thereof.

We claim:

1. A method for minimizing overhead usage of a host system during service of interrupts generated by at least one peripheral device, the method including the steps of:

determining, before the end of a prior interrupt service routine, a predicted interrupt time point when a subsequent interrupt will be generated by the at least one peripheral device, wherein said predicted interrupt time point is determined before said subsequent interrupt is generated by said at least one peripheral device;

setting the host system in a polling mode if the predicted interrupt time point is before a predetermined time period after the end of the prior interrupt service routine, wherein said host system is set in said polling mode before said subsequent interrupt is generated by said at least one peripheral device; and setting the host system in an interrupt mode if the predicted interrupt time point is after the predetermined time period after the end of the prior interrupt service routine, wherein said host system is set in said interrupt mode before said subsequent interrupt is generated by said at least one peripheral device.

2. The method of claim 1, wherein a start processing bit is set at a first state to indicate that the host system is to operate in the polling mode and at a second state to indicate that the host system is to operate in the interrupt mode, before the end of the prior interrupt service routine, and wherein the host system reads the start processing bit at the end of the prior interrupt service routine.

3. The method of claim 1, wherein the predetermined time period is comprised of at least one of an in-context switching time and an out-context switching time.

4. The method of claim 1, wherein the host system polls for the subsequent interrupt to enter a subsequent interrupt service routine at the predicted interrupt time point, when the host system operates in the polling mode.

5. The method of claim 1, wherein a peripheral device is a communications network peripheral device and wherein an interrupt is generated by the communications network peripheral device when a predetermined amount of an information frame has been received by the communications network peripheral device from a communications network.

6. A method for minimizing overhead usage of a host system during service of interrupts generated by a communications network peripheral device, the method comprising the steps of:

determining, before the end of a prior interrupt service routine, a predicted interrupt time point when a subsequent interrupt will be generated by the communications network peripheral device, the subsequent interrupt being generated when an optimum amount of an information frame has been received by the communications network peripheral device from a communications network;

setting the host system in a polling mode if the predicted interrupt time point is before a predetermined time period after the end of the prior interrupt service routine, the predetermined time period being comprised of at least one of an in-context switching time and an out-context switching time;

setting the host system in an interrupt mode if the predicted interrupt time point is after the predetermined time period after the end of the prior interrupt service routine;

setting, within the communications network peripheral device, a start processing bit at a first state to indicate that the host system is in the polling mode and at a second state to indicate that the host system is in the interrupt mode, before the end of the prior interrupt service routine, and wherein the host system reads the start processing bit at the end of the prior interrupt service routine; and polling, within the host system, for the subsequent interrupt to enter a subsequent interrupt service routine at the predicted interrupt time point when the host system operates in the polling mode.

7. An apparatus within a peripheral device for minimizing overhead usage of a host system during service by the host system of interrupts generated by the peripheral device, the apparatus comprising:

a data storage unit for storing interrupt time information used for determining, before the end of a prior interrupt service routine, a predicted interrupt time point when a subsequent interrupt will be generated by the peripheral device, wherein said predicted interrupt time point is determined before said subsequent interrupt is generated by said at least one peripheral device; and a bit-storage unit having a start processing bit that is set at a first state when the host system is to operate in a polling mode if the predicted interrupt time point is before a predetermined time period after the end of the prior interrupt service routine, wherein said host system is set in said polling mode before said subsequent interrupt is generated by said at least one peripheral device.

8. The apparatus of claim 7, wherein the start processing bit is set at a second state when the host system is to operate in an interrupt mode if the predicted interrupt time point is after a predetermined time period after the end of the prior interrupt service routine.

9. The apparatus of claim 7, wherein the predetermined time period is comprised of at least one of an in-context switching time and an out-context switching time.

10. The apparatus of claim 7, wherein the host system polls for the subsequent interrupt to enter a subsequent interrupt service routine at the predicted interrupt time point, when the host system operates in the polling mode.

11. The apparatus of claim 7, wherein the peripheral device is a communications network peripheral device and wherein an interrupt is generated by the communications network peripheral device when an optimum amount of an information frame has been received by the communications network peripheral device from a communications network.

12. The apparatus of claim 7, wherein a data processor of the peripheral device determines the predicted interrupt time point from the interrupt time information.

13. An apparatus within a peripheral device for minimizing overhead usage of a host system during service by the host system of interrupts generated by the peripheral device, the apparatus comprising:

means for determining, before the end of a prior interrupt service routine, a predicted interrupt time point when a subsequent interrupt will be generated by the peripheral device, wherein said predicted interrupt time point is determined before said subsequent interrupt is generated by said at least one peripheral device; and means for setting the host system to operate in a polling mode if the predicted interrupt time point is before a predetermined time period after the end of the prior interrupt service routine and in an interrupt mode if the predicted interrupt time is after the predetermined time period after the end of the prior interrupt service routine, wherein said host system is set in one of said polling mode or said interrupt mode before said subsequent interrupt is generated by said at least one peripheral device.

14. The apparatus of claim 13, wherein the predetermined time period is comprised of at least one of an in-context switching time and an out-context switching time.

15. The apparatus of claim 13, wherein the host system polls for the subsequent interrupt to enter a subsequent interrupt service routine at the predicted interrupt time point, when the host system operates in the polling mode.

16. The apparatus of claim 13, wherein the peripheral device is a communications network peripheral device and wherein an interrupt is generated by the communications network peripheral device when an optimum amount of an information frame has been received by the communications network peripheral device from a communications network.

* * * * *